United States Patent [19]
Jervis

[11] Patent Number: 5,109,445
[45] Date of Patent: Apr. 28, 1992

[54] STRAINED DISTRIBUTION OPTICAL FIBER COMMUNICATION SYSTEM

[75] Inventor: James E. Jervis, Atherton, Calif.

[73] Assignee: Raychem Corp., Menlo Park, Calif.

[21] Appl. No.: 513,526

[22] Filed: Apr. 19, 1990

Related U.S. Application Data

[63] Continuation of Ser. No. 265,735, Nov. 1, 1980, Pat. No. 4,983,008, which is a continuation-in-part of Ser. No. 87,957, Aug. 17, 1987, abandoned, which is a continuation-in-part of Ser. No. 317,148, Feb. 28, 1989, abandoned, which is a continuation-in-part of Ser. No. 899,368, Aug. 22, 1986, abandoned, and Ser. No. 899,363, Aug. 22, 1986, abandoned.

[51] Int. Cl.$^5$ .............................................. G02B 6/28
[52] U.S. Cl. ..................................... 385/24; 385/135; 385/136; 174/76; 174/92
[58] Field of Search ................ 350/96.2, 96.23, 96.15; 174/92, 93, 76; 385/15, 24, 134, 136, 135

[56] References Cited

U.S. PATENT DOCUMENTS

| | | | |
|---|---|---|---|
| 4,768,854 | 9/1988 | Campbell et al. | 360/96.16 |
| 4,859,809 | 8/1989 | Jervis | 174/92 |

*Primary Examiner*—John D. Lee
*Assistant Examiner*—John Ngo
*Attorney, Agent, or Firm*—Dennis E. Kovach; Herbert G. Burkard

[57] ABSTRACT

A strained distributed optical fiber distribution network includes read and write optical fibers having taps attached thereto in series so as to strain portions of the fiber in exces of 0.60%, the strained portions being environmentally isolated by an enclosure which includes gel filled seals subject to a resilient load.

8 Claims, 5 Drawing Sheets

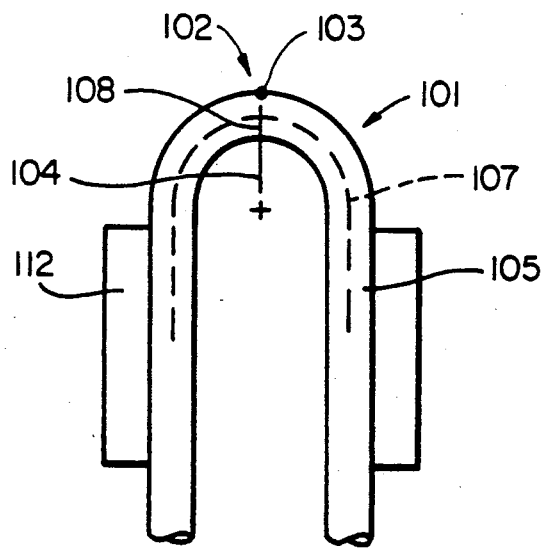
FIG_1
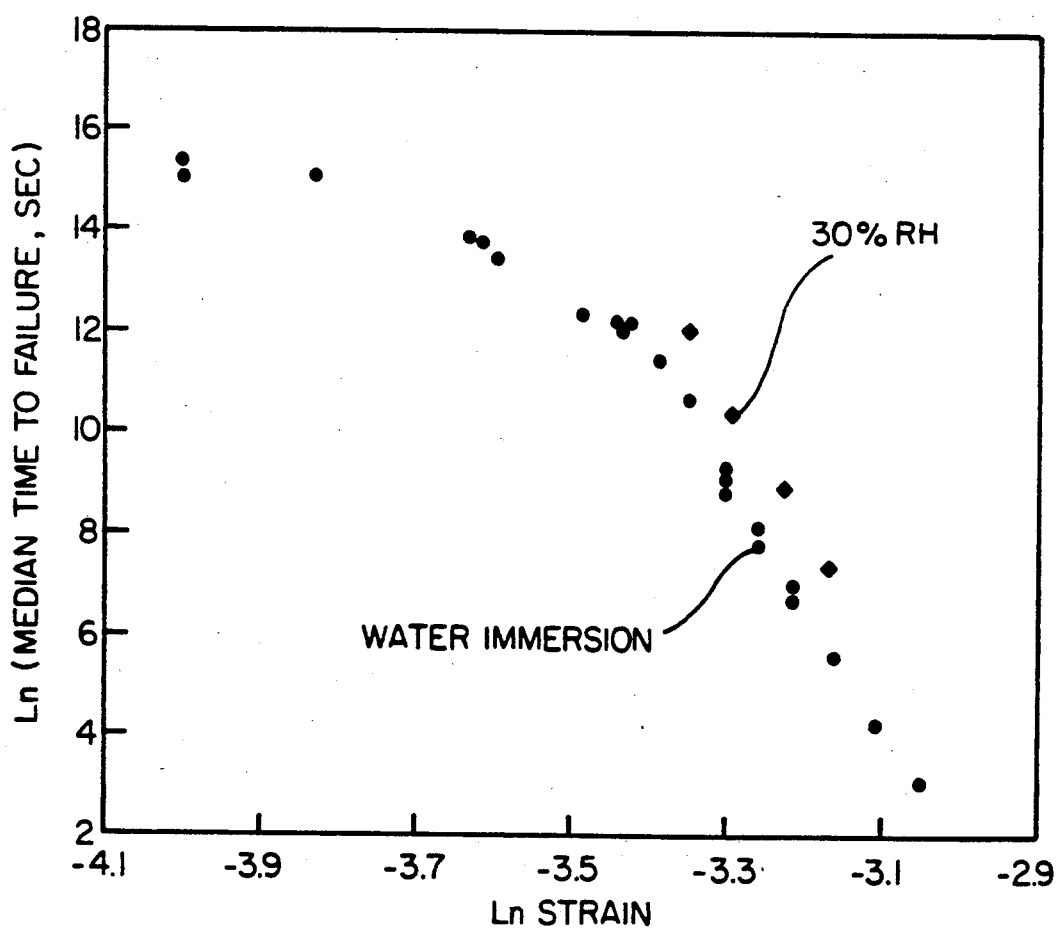
FIG_2

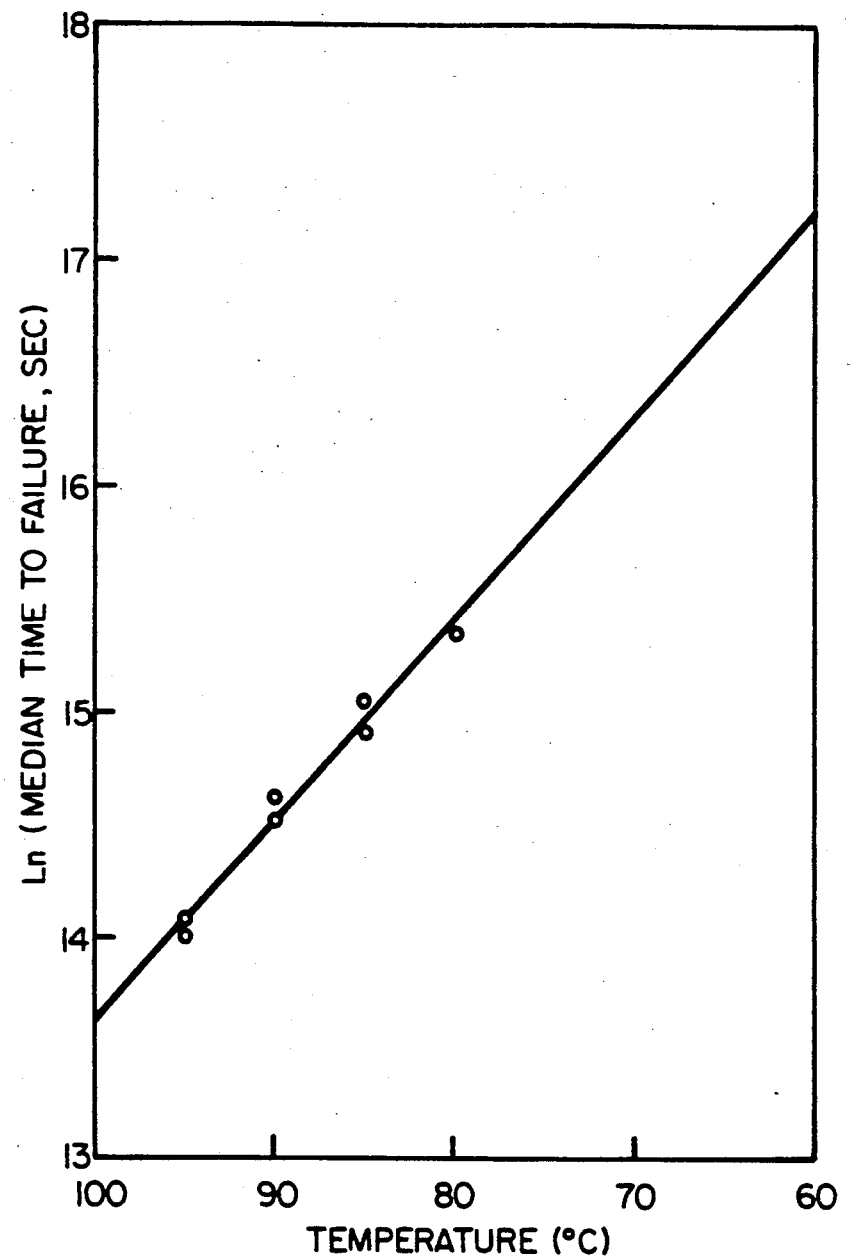
FIG_3
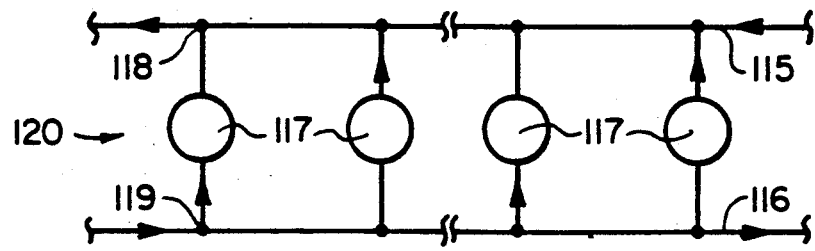
FIG_4

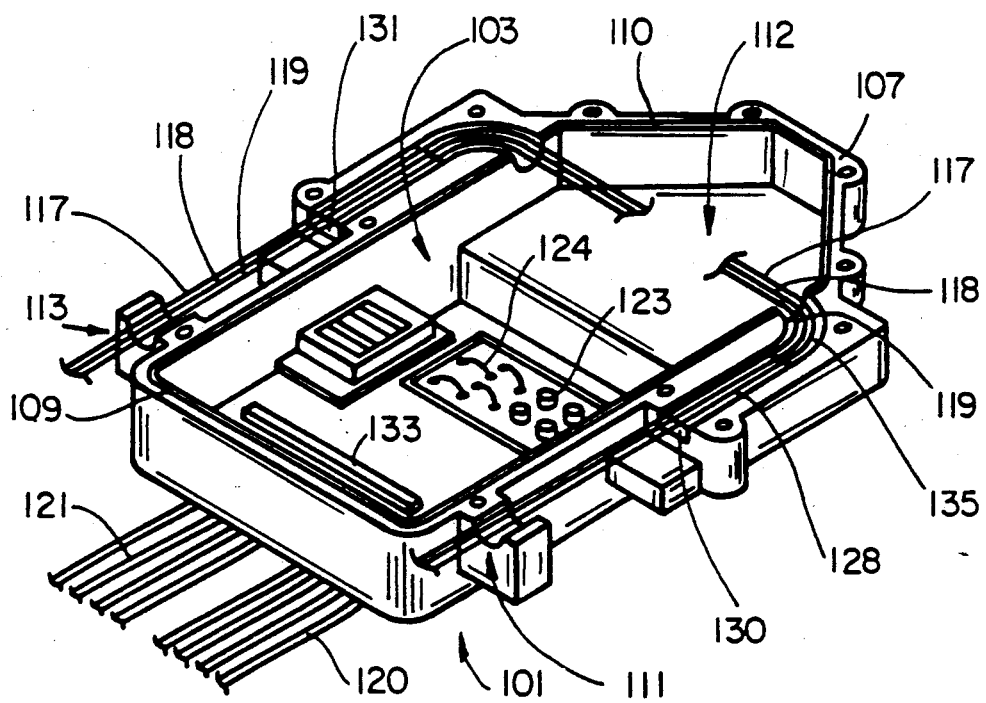
FIG_5
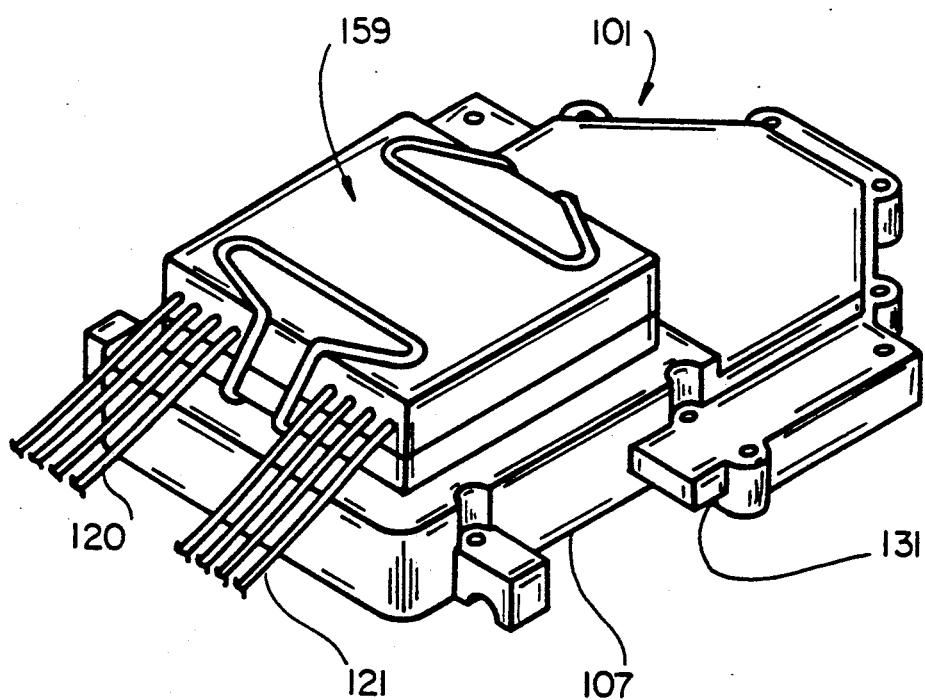
FIG_6

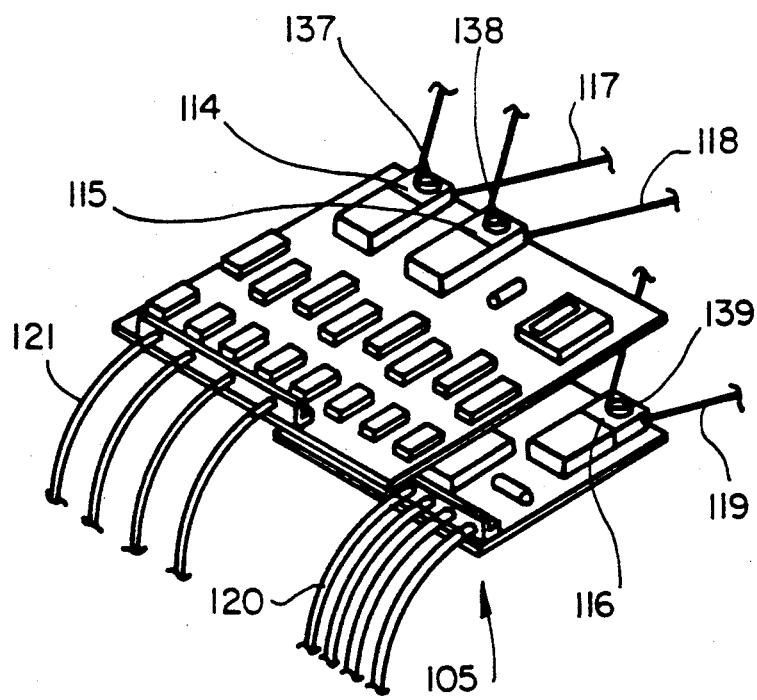
FIG_7
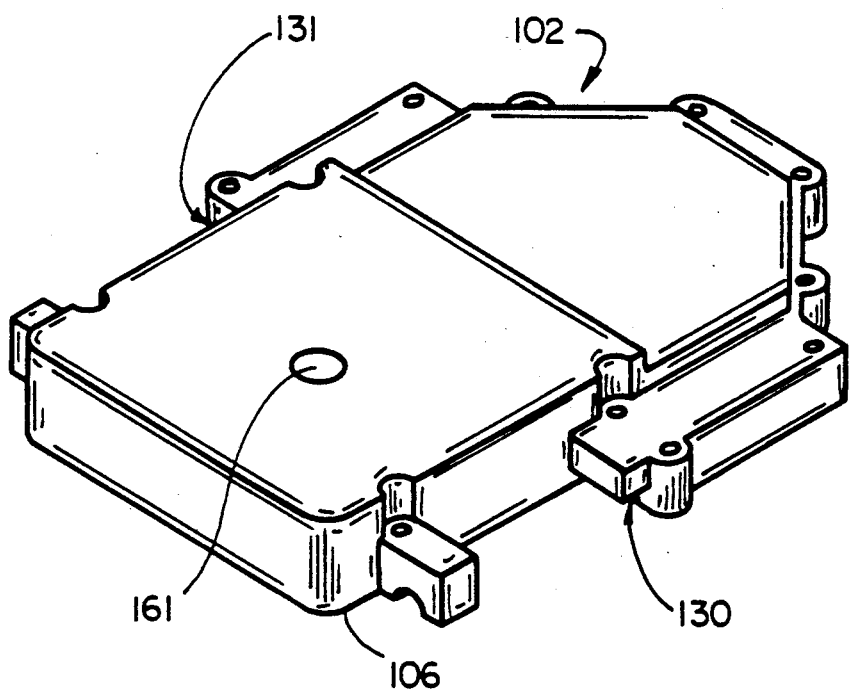
FIG_8

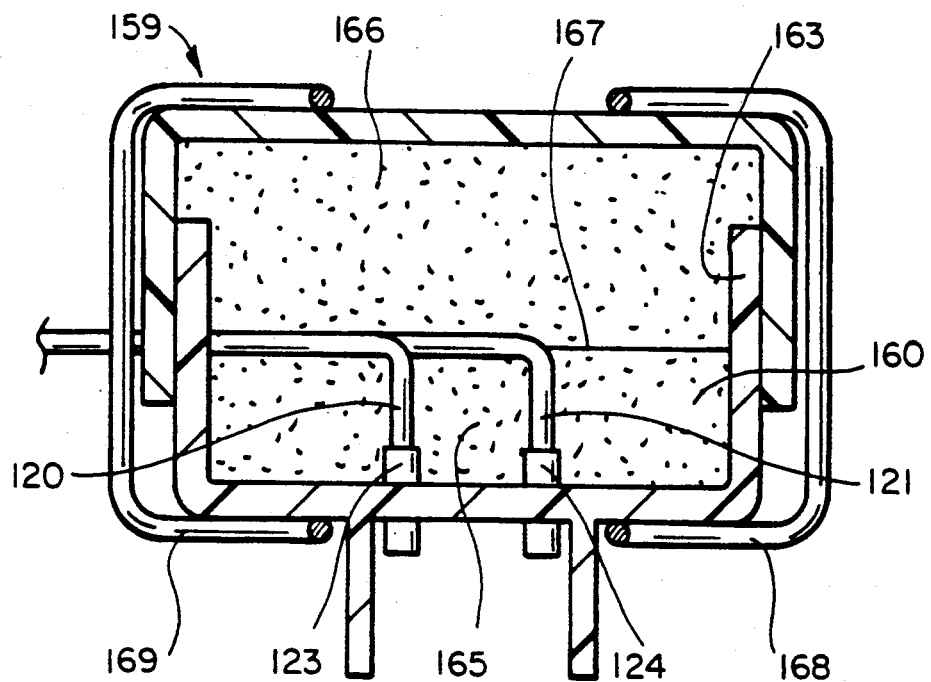
FIG_9
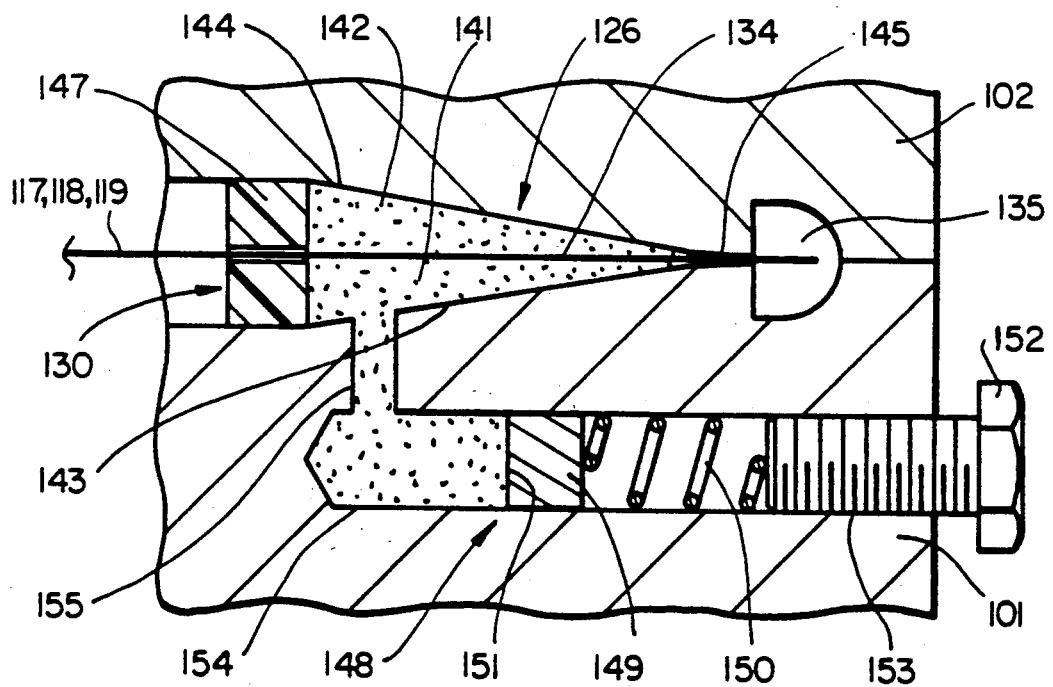
FIG_10

5,109,445

STRAINED DISTRIBUTION OPTICAL FIBER COMMUNICATION SYSTEM

CROSS-REFERENCES TO RELATED APPLICATIONS

This application is a continuation of copending application Ser. No. 07/265,735 as originally filed on Nov. 1, 1988 (now U.S. Pat. No. 4,983,008), which is a continuation-in-part of U.S. Ser. No. 07/087,957 filed Aug. 17, 1987 (now abandoned), which is a continuation-in-part of U.S. application Ser. No. 317,148 filed Feb. 28, 1989 (now abandoned), which was a continuation-in-part of U.S. Ser. Nos. 06/899,368 and 06/899,363, both filed Aug. 22, 1986 (now abandoned), the disclosures of which are incorporated herein by reference.

BACKGROUND OF THE INVENTION

The present invention relates to methods and systems for distributing information between a plurality of nodes or connections using an optical fiber, the fiber preferably comprising a core, a cladding and a protective coating, the core and cladding preferably being made of glass, the coating being a buffer made of a polymeric material, the fiber being either single or multimode, and step or graded index, the invention being applicable to both glass-on-glass fibers and plastic clad fibers.

Prior art methods for distributing information between a plurality of nodes or connections have generally relied upon the use of copper wire for creating a plurality of point-to-point links between a central node and the plurality of nodes to which distribution is desired. For example, for telephone service, the central node generally corresponds to a telephone central office, a private branch exchange (PBX), or a feeder station.

Since optical fiber has extraordinary high band-width potential, numerous concepts have been proposed whereby a single optical fiber is utilized by a plurality of nodes for distributing information therebetween, the advantage of such concepts being the use of a shorter length of communication cable as compared to architectures utilizing point-to-point links, a further advantage being that the cost of components in systems embodying such concepts which are used by more than one node is shared by all the nodes using that component so that the per node cost of such equipment is correspondingly reduced.

Notwithstanding these advantages, actual distributive optical fiber communication systems have remained largely a laboratory curiosity due to various technical problems in implementing such concepts using optical fiber. One problem has been that of tapping optical fibers so that each of the plurality of nodes can withdraw information from the optical fiber and inject information into the optical fiber in an inexpensive and yet efficient manner so as to render the system capable of serving a sufficiently large number of nodes to make the cost of the system competitive with electrical systems.

To date, various tap proposals, in addition to being unduly expensive, are also problematic when long term system life is desired since it is known that static fatigue is detrimental to the integrity of optical fiber. In fact, the problem of static fatigue failure of optical fibers has long been recognized by the prior art and has long been a critical design criteria evaluated when implementing any kind of static optical fiber telecommunications system. For systems wherein the fiber is to remain in a static environment over a long period of time, the prior art teaches that the maximum long-term stress the fiber is to be subjected to be of the order $0.2\sigma$ to $\frac{1}{3}\sigma$, $\sigma$ being the proof stress of the fiber shortly after being manufactured, the proof stress for typical optical fibers generally being of the order of 500 kpsi to 1000 kpsi, such proof stresses generally corresponding to 0.5% and 1.0% strain respectively. Accordingly, the prior art teaches that for long term static optical fiber telecommunication installations, the maximum strain any part of the fiber is to be subjected to be of the order of 0.33% strain and below (see page 94 of Conference on Optical Fiber Communications, Mini-tutorial Sessions '86; and Skutnik et al. "High Strain, Reliable, Hard Clad Silica (HCS) TM Fibers", presented at FOC/LAN '85, page 235, left column lines 1-2).

SUMMARY OF THE INVENTION

According to one aspect of the invention, it has unexpectedly and surprisingly been discovered that stresses and strains well in excess of those otherwise heretofore believed possible can be endured by optical fibers having thin transparent polymeric buffers, such as an acrylate or a silicone, preferred buffers having an index of refraction higher than the fiber cladding, so that distribution systems can be utilized wherein light is injected and/or withdrawn into or from an optical fiber core locally by passing the light through the buffer of the optical fiber at a bend or in a vicinity thereof without creating a system whereby the fibers would prematurely fracture and render the system practically non-useful. Specifically, it has been determined that stresses and strains well in excess of a proof stress and strain of the fiber can be endured by fibers in appropriately controlled environments for tens of years, and that almost unlimited lifetime can be generated by appropriate control of humidity.

Accordingly, the invention includes systems and components thereof which include optical taps which generate and maintain relatively large static strains to optical fiber portions, and means for environmentally isolating such portions in a static manner so as to insure system integrity, preferred embodiments of the invention including a telephone subscriber loop network for providing a communication link between consumer telephones and interoffice or long distance telephone switching equipment, preferred taps and networks being those disclosed in EPC 86/305329.4 and EPC 82/302158.9, assigned to the assignee of the invention, the disclosures of which are incorporated herein by reference.

BRIEF DESCRIPTION OF THE DRAWINGS

FIG. 1 illustrates an experimental geometry whereby a plurality of samples of optical fiber were tested for static fatigue;

FIGS. 2 and 3 illustrate various results from various static fatigue tests conducted with the experimental apparatus of FIG. 1;

FIG. 4 illustrates one preferred embodiment of a distribution architecture usable with the invention;

FIGS. 5 and 6 illustrate in perspective top and bottom views of a bottom portion of a closure useful with the invention;

FIG. 7 illustrates in perspective processing electronics to be disposed within an interior of the closure of FIGS. 5 and 6;

FIG. 8 illustrates in perspective a top portion of the closure;

FIG. 9 illustrates in cross section a secondary closure; and

FIG. 10 illustrates in cross section details of a passage seal incorporated in the closure.

DESCRIPTION OF THE PREFERRED EMBODIMENTS

According to the invention, it has surprisingly been discovered that a probability of failure of an optical fiber in an optical fiber distribution system which includes a plurality of highly stressed optical fiber portions or regions is unexpectedly lower than otherwise known thus rendering feasible such a distribution system which locally injects light into and/or locally detects light from an optical fiber core by using bends which generate stresses and strains heretofore believed to be unacceptably high for a static system. In particular, it has been discovered that extremely high levels of stress and strain can be tolerated in a static optical fiber distribution communication system and yet achieve an acceptably low probability of failure due to static fatigue over a significantly long period of time, such as several months, and even several years, for example 5 years, 10 years, 15 years, and even 20 and 40 years.

More specifically, detailed analysis of short term static fatigue data on optical fiber stressed by bending an amount sufficient so that light can be injected or withdrawn into or from the fiber core by passing the light through the fiber buffer or coating indicate that far higher stresses (and hence smaller bend radii) are possible than was heretofore believed to be tolerable so as to yield acceptable probabilities of fiber failure by breakage so as to render such fiber geometries in conjunction with other structure useful.

EXAMPLE 1

Various experiments were done on Corning graded index glass-on-glass fiber having core, cladding, and buffer diameters of 100, 140, 250 um, respectively, the buffer being made of an acrylate material, the fiber having been proof tested shortly after manufacture at 500 kpsi.

Essentially, large numbers of samples of such fiber having the buffer left intact were bent about various radiuses of curvature with a fixture 112 as shown in FIG. 1 so as to generate a 180° bend arc 101 and induce a desired maximum stress and strain to the fiber 5 at a center portion 102 of the arc 101, the maximum stress at the center portion 102 of the arc 101 being induced on a point 103 on the outermost circumference of the fiber which is colinear with a bend radius line 104 in a region of the arc where the bend radius is a minimum. Points on and within the fiber radially and circumferentially displaced from the point 103 were subjected to less stress than the point 103, the stress continuously decreasing as the points approach the neutral bend axis 107 of the fiber, with theoretically no stress being generated in a plane of the neutral axis which is perpendicular to the plane of FIG. 1. Below this plane 107 in a region 108 of the fiber 105 the fiber is actually in compression rather than in tension.

Numerous samples of the graded index fiber were bent as described to generate various values of maximum stress, and the samples were monitored to determine their times to failure. The analyzed data is set forth in Tables 1-3 and in FIGS. 2-3 which shows median times to failure in seconds of the samples. Specifically, data was taken and analyzed for (1) fiber immersed in 80° C. water at various strains (Table 1 and FIG. 2); (2) fiber immersed in 80° C. air at 30% relative humidity at various strains (Table 2 and FIG. 2); and (3) fiber immersed in water at 1.83% strain at temperatures (Table 3 and FIG. 3).

An analyses of FIG. 2 reveals that the data for 80° C. water immersion is not exactly linear and that a bend or "knee" exists at ln(strain)=−0.34, e.g. at 3.33% strain. Analyzing the data to the right of ln(strain)=−3.4 using linear regression techniques yields, for 80° C. water immersion:

$$\ln(med.\ t\ to\ fail\ (sec)) = -25.1601\ \ln(strain) - 74.0397 \quad (1)$$

and to the left of the knee linear regression techniques yields:

$$\ln(med.\ t\ to\ fail\ (sec)) = -5.6187\ \ln(strain) - 7.0321 \quad (2)$$

No "knee" or bend is indicated by the data for 80° C. 30% relative humidity in FIG. 2 and Table 2. A linear regression analysis of this data yields the following equation:

$$\ln(med.\ t\ to\ fail\ (sec)) = -24.9275\ \ln(strain) - 71.6758 \quad (3)$$

A linear regression analysis of the data of Table 3 and FIG. 2 for 1.83% strain at various temperatures for water immersion yields the following equation:

$$\ln(med.\ to\ fail\ (sec)) = 11.2515\ (1000/T(°K.)) - 16.5007 \quad (4)$$

TABLE 1

Median Time to Failure of Fiber in 80° C. Water at Various Strains

| Strain | ln(strain) | ln(time)(sec) |
|---|---|---|
| 1.827% | −4.0022 | 15.2964 |
| 1.833% | −3.9995 | 14.9650 |
| 2.164% | −3.8334 | 15.0100 |
| 2.642% | −3.6336 | 13.7780 |
| 2.689% | −3.6160 | 13.6661 |
| 2.733% | −3.5998 | 13.3606 |
| 3.050% | −3.4900 | 12.3132 |
| 3.197% | −3.4430 | 12.1471 |
| 3.207% | −3.4399 | 11.9521 |
| 3.250% | −3.4264 | 12.1817 |
| 3.367% | −3.3912 | 11.4137 |
| 3.506% | −3.3506 | 10.6754 |
| 3.666% | −3.3060 | 9.2137 |
| 3.666% | −3.3060 | 9.0136 |
| 3.666% | −3.3060 | 8.7879 |
| 3.832% | −3.2617 | 8.1214 |
| 3.832% | −3.2617 | 7.7236 |
| 4.010% | −3.2165 | 7.0054 |
| 4.010% | −3.2165 | 6.6616 |
| 4.225% | −3.1641 | 5.5470 |
| 4.454% | −3.1115 | 4.2050 |
| 4.715% | −3.0545 | 3.0478 |

TABLE 2

Median Time to Failure of Fiber in 80° C. Air at 30% Relative Humidity at Various Strains

| Strain | ln(Strain) | ln(time)(sec) |
|---|---|---|
| 3.491% | −3.3548 | 11.9924 |
| 3.706% | −3.2953 | 10.3620 |

TABLE 2-continued

Median Time to Failure of Fiber in 80° C.
Air at 30% Relative Humidity at Various Strains

| Strain | ln(Strain) | ln(time)(sec) |
| --- | --- | --- |
| 3.955% | −3.2301 | 8.9378 |
| 4.197% | −3.1709 | 7.3357 |

TABLE 3

Median Time to Failure of Fiber at 1.83% Strain at Various Temperatures in Water Immersion

| Temperature (C.) | 1000/T (K$^{-1}$) | Strain | ln(Median Time to Failure (sec) |
| --- | --- | --- | --- |
| 80 | 2.8317 | 1.833% | 15.2964 |
| 85 | 2.7921 | 1.832% | 15.0316 |
| 85 | 2.7921 | 1.832% | 14.8436 |
| 90 | 2.7537 | 1.833% | 14.5705 |
| 90 | 2.7537 | 1.834% | 14.4979 |
| 95 | 2.7163 | 1.833% | 13.9889 |
| 95 | 2.7163 | 1.833% | 14.0486 |

A "worse case" environment for optical fiber distribution system is much better than those simulated by the experiment. Specifically, by appropriately enclosing the portions of the optical fiber stressed, water immersion can be prevented, and by using a desiccant any desired humidity level can be maintained, a preferred closure being that disclosed in FIGS. 5–10. In addition, a maximum temperature the stressed fiber should encounter in the environment is believed to be in the range of 40° C., 50° C., or 60° C., and the maximum percent of the time this maximum temperature would exist is around 10%, the inverse of this being a dwell time conversion factor (D).

An equation derived from the Arrhenius equation and set forth below can be used to arrive at a factor (A) which when multiplied to the times in FIG. 2 convert this data to 60° C.

$$A = \frac{t_1 (60° C.)}{t_2 (80° C.)} = e^{\frac{E}{k}(\frac{1}{T1} - \frac{1}{T2})}$$

where E is an activation energy, k is a constant, and $T_1$ and $T_2$ are 60° C. and 80° C. respectively converted to degrees Kelvin.

Since the two point bending experiments stress a different length of fiber than a side read or write tap geometry preferred to be used as disclosed in EPC 86/305329.4, the disclosure of which is incorporated herein by reference, a gauge length correction (B) is necessary to further convert the data of FIG. 2, this conversion making use of equation (6) below:

$$B = \left(\frac{l(tap)}{l(2\text{-pt bend})}\right)^{(\frac{n-2}{m})} \tag{6}$$

where l(tap) and l(2-pt bend) are an expected tap arc length and the 2-pt bending arc length, −n is the slope of ln(time to fail) vs ln(strain) curve (in the case of FIG. 2, n=5.6186) and m is the fiber Weibull shape parameter or modulus and is derived from the Weibull cumulative failure distribution function which can be written as:

$$F(t) = 1 - \exp\left[-\left(\frac{t}{\gamma}\right)^m\right] \tag{7}$$

where t is the time to failure and F is the cumulative failure probability.

For the Corning fiber, m was calculated to be equal to 88. Assuming l(tap)=0.2 mm, and l(2-pt bend)=2.75 mm, B=0.9.

In addition, equation (6) can be utilized to generate another correction factor (C) to convert the median time to failure data to data projecting the time to failure of less than the median. For a probability of failure of $10^{-4}$, $C_1$ is calculated to equal about 0.9, and for a probability of failure of $10^{-6}$, $C_2$ is calculated to equal 0.86.

Accordingly for water immersion at 80° C. the median time to failure is as shown in Table 4, as well as the time to failure by applying conversions A, B, C, D.

TABLE 4

| Strain (%) | Time | Converted Times (years) |
| --- | --- | --- |
| 0.5 | 240 years | 1.3 × 10$^4$ |
| 1.0 | 4.8 years | 264.0 |
| 1.83 | 59 days | 8.9 |
| 2.0 | 36 days | 5.4 |

However, correcting or converting for humidity, from the data of FIG. 2, yields the following median lifetimes at 80° C. as shown in Table 5.

TABLE 5

| Strain % | Time (yrs) |
| --- | --- |
| 0.5 | 1.2 × 10$^{14}$ |
| 1.0 | 2.87 × 10$^{11}$ |
| 1.83 | 6.25 × 10$^4$ |
| 2.0 | 6.87 × 10$^3$ |

Since these times are extraordinarily long, it can be appreciated new and unexpected results are achievable if humidity control is utilized, even at constant high temperatures. In addition, it has experimentally been confirmed that fibers with silicone buffers are much more resistant to static fatigue than acrylate buffered fibers, and hence would yield even more favorable results.

FIG. 4 illustrates a preferred embodiment of the invention whereby a distribution architecture 120 includes a plurality of stations 117 interconnected by optical fibers 115, 116 via read taps 119 and write taps 118. The read taps 119 withdraw light from a core of an intermediate section of the read optical fiber 116 by passing the light through a side of the fiber core, cladding and buffer by using a bend, and the write taps inject light into a core of the optical fiber 115 by passing the light through a side of the fiber buffer, cladding, and core by using a bend.

In each case the fiber bend has a radius of curvature such that it is less than the minimum bend radius of the fiber, as determined by its proof stress, and in particular the maximum stress generated at the bend is greater than one-third the fiber proof stress, preferably greater than one-half the proof stress, more preferably greater than the proof stress, and can be greater by a factor of 1.3, 1.5, 1.8, 2.0, 2.5, and even 3.0. Stated differently, the maximum strain generated at the bend is preferably in excess of one of 0.60%, 0.75%, 1.0%, 1.2%, 1.4%, 1.6%, and 2.0%, preferred maximum strains being as low as possible and yet sufficiently high so as to produce a bend which allows sufficient optical coupling with the fiber core.

According to a preferred embodiment, the station 117 includes telephones in communication therewith, and the optical fibers 115, 116 are connected to a long distance telephone interface for switching signals to and from the telephones 117 with remote telephone locations. The long distance interface is generally located at a telephone central office or remote extension thereof. Hence, according to a preferred embodiment, the invention comprises a subscriber telephone system which includes the features previously described, the system having tap bends which impose a maximum static stress in excess of one-half the fiber proof stress and/or impose a maximum static strain in excess of 0.75%, the fiber remaining in a static attitude subsequent to installation whether or not telephones serviced by the taps are operating or operational, the fiber having an installed life in excess of any one of 15, 20, 30 and 40 years, e.g. within that period of time fracture due to static stress or static strain will not occur. According to a preferred embodiment, though portions of the fiber are located in a closure under relatively high static stress and strain, preferably remaining portions of the fiber are cabled and installed so as not to unduly stress the remaining portions of the cable, and in particular so that a maximum stress imposed on the remaining portions of the fiber does not exceed one-third the proof stress of the fiber, either by reason of axial tension or by bending.

Preferably the fiber coating comprises an organic polymer, an acrylate and/or silicon being preferred. According to other preferred embodiments the fiber cladding has a thin inorganic coating disposed thereon having a thickness in the range of 1 to 20 microns, and an organic coating is disposed around the inorganic coating. Of course such composite coatings must be optically transparent at the lightwave length to be used for transmitting and receiving information, and must have an index of refraction higher than the fiber cladding throughout its thickness.

According to other preferred embodiments, the stations 117 include video monitors and tuners, computers, etc., and/or telephones as well, a preferred distribution architecture being a bus architecture, as illustrated in FIG. 4. Preferably, the taps 118, 119 are contained within a water-tight closure so as to environmentally isolate the fiber bends from the environment, and specifically from water and preferably significant humidity levels.

FIGS. 5 and 6 illustrate perspective views of a top and a bottom, respectively, of a bottom portion 1 of a preferred closure usable with the invention wherein the taps are to be contained and environmentally isolated, especially the strained fiber portions. FIG. 8 illustrates in perspective a top portion 2 of the closure, and FIG. 7 illustrates in perspective elements such as processing electronics 5 to be housed within an interior 3 of the closure formed by the first and second closure portions 1, 2.

For telephone service, each closure would house at least one read tap and one write tap, and if separate video and/or data service is also available, then optionally additional read and/or write taps for additional fibers. A single set of taps can with appropriate software service a plurality of subscribers, e.g. one read-write pair could be connected to eight or ten houses for example, such variations and permutations being included within the scope of the invention.

According to one preferred embodiment, the first and second closure portions 1, 2 are secured together by mating confronting bottom and top surfaces 6, 7 thereof together, with gaskets 9 and 10 being thus disposed therebetween, and securing the first and second closure portions 1, 2 together by means such as screws, bolts, etc. (not shown). The closure portions 1, 2 can be made of plastic or metal, and the gaskets 9, 10 can be made of foam or other resilient material, metal gaskets being preferred for use with metal closure portions, metal providing the optimum barrier against moisture vapor transmission between locations 11, 13 outside the closure interior 3 and location 12 with the interior 3. According to this embodiment, an interior of the closure is of fixed volume.

Referring to FIG. 5, any number of a plurality of communication lines 17, 18, 19, preferably optical fibers (e.g. read and/or write fibers 115, 116) enter the closure interior 3 from the location 11 outside the closure through a first passageway 30 so as to be disposed within the closure interior 3, the communication lines exiting the closure interior 3 via a second passageway 31 so as to then extend past the location 13 again outside the closure. Optionally processing electronics 5 can be disposed within the closure interior 3 so as to process information being propagated by the communication lines 17-19, and further optionally at least some of this processed information can be propagated by further communication lines 20, 21 within the closure interior 3. According to the embodiment illustrated in FIG. 5, the further communication lines 20, 21 can exit the closure via ports or connectors 23, 24 and thus enter a secondary closure 59 (illustrated in FIGS. 6 and 9) and exit the apparatus of the invention from the secondary closure 59.

According to a preferred embodiment the lines 17-19 are optical fibers. For such an embodiment, the number of optical fibers entering and exiting the closure is between 1 and 200 though more can be utilized as needed, with a width of and a number of the seals or passageways 30, 31 being sized accordingly. With embodiments including processing electronics 5 and further lines 20, 21 rather than simply splices and organizing trays, the number of lines is typically smaller, for example 2-30, possibly 2-15, e.g. about 2-8. With embodiments lacking the processing electronics, the closure may provide a branching function and hence may have the aforementioned trays, splices, etc., and may house only optical or only electrical lines.

The passageways 30, 31 will next be described in more detail with particular reference to FIG. 10 which shows details of the passageway 30. Though two passageways 30, 31 are illustrated in FIG. 5 it should be recognized the lines 17-19 can enter and exit through a common passageway to facilitate craft installation, and when two or more passageways are utilized they need not necessarily be of identical construction.

The passageway 30 includes a closure passage seal 26 which includes first and second materials 41, 42, preferably gels, disposed in first and second cavities 43, 44 in closure portions 1, 2, respectively. Each gel is preferably formed of a material of any of the types described in U.S. Pat. Nos. 4,600,261 and 4,634,207, 4,634,207; U.S. application Ser. Nos. 507,433 filed Jun. 23, 1983 (now abandoned); 507,435 filed Jun. 23, 1983 (now abandoned): 772,072 (now abandoned) and 772,073 (now abandoned), both filed Sep. 3, 1985 and both being continuation-in-part of U.S. application Ser. No. 646,555 filed Aug. 31, 1984 (now abandoned); the disclosures of which are incorporated herein by reference.

Specifically, the gels 41, 42 have a cone penetration value from approximately 80 to 350 ($10^{-1}$ mm), preferably between 100 and 350, more preferably between 200-350, 200 and 300, e.g. between 220 and 280 ($10^{-1}$ mm); an ultimate elongation of at least 15%, 20%, or 30%, preferably at least 50%, 100%, 200% or 500%, an adhesive strength of a exposed surface of the gel to itself or a similar gel being less than a cohesive strength of each of the gels 41, 42 and less than an adhesive strength of each of the gels to its respective container. Accordingly, when the closure portions 1, 2 are separated, the gels 41, 42 will separate at their mutual interface 34 rather than being torn out of their respective cavities 43, 44 or being torn within an interior of either of the gels, this being advantageous since separation at the interface 34 allows easy and clean access to the communication lines 17-19 for reentry into the closure.

The stated parameters for the cone penetration are provided in accordance with the American National Standard Designation ASTM D217 on an undisturbed sample at 70° C.±5° F. using a standard 1:1 scale cone (cone weight 102.5 g, shaft weight 47.5 g), the penetration being measured after five seconds. The elongation values are determined in accordance with American National Standard Designation ASTM D638-80, at 70° C.±5° F., using a Type numeral 4 dye to cut the sample and at a speed of 50 cm/min. A viscous flow of the gel is such that it tends to conform around an outer surface of an object suppressed therein, and exerting pressure on the gel increases the degree and quality with which the gel conforms to the object. The gel preferably also comprises a three dimensional at least partially cross-linked network.

Preferably, the surfaces of the gels 41, 42 in contact with the lines 17-19 elastically deform around the shape of the lines 17, 19, with the gels 41, 42 preferably being made of materials which are adherent to the communication lines 17-19 and to each other so as to form an excellent moisture barrier for the communication lines 17-19 and the closure interior 3. Regardless of the adherence properties of the gel, since its surface is deformed and since it is maintained under a resilient "live" load, it is maintained in elastic tension where it contacts the fiber and hence closely adheres to the communication lines 17, 19 since the gel is locally compressed by the lines 17-19 and pressurized.

In addition, the surfaces of the gel are preferably tacky and hydrolytically stable, and also substantially inert towards materials forming the cavities 43, 44 as well as materials forming the lines 17-19. The gel is further preferably electrically insulating and has a volume resistivity of at least preferably approximately $10^9$ ohms/cm. Such gels can be formed from urethane, butyl rubber, or silicone compositions as described in the documents cited above. Alternative materials include foams of the described cone penetration and elongation values, with the foams being impregnated with an appropriate substrate, such as a grease, a polyisobutyl, etc., the foams being either open cell or closed cell.

According to the embodiment shown in FIGS. 5, 6, 8, and 10, the seal 26 includes the above-described gels or materials (hereinafter for convenience simply referred to as gels) 41, 42, the gels being disposed in the cavities 43, 44, with the cavities 43, 44 preferably having a tapering profile, e.g. a V shaped or wedge shaped profile such that a converging end 45 of the cavities 43, 44 is substantially thin so as to functionally act as a barrier to prevent any substantial amount of the gel 41, 42 entering the enlarged cavity 35 whereat the communication lines 17-19 enter the closure interior 3, this being due to the above-stated three dimensional network of the gel exemplified by its significant cone penetration and elongation values. An opposite end of the cavities 43, 44 whereat the lines 17-19 either enter or exit the closure is blocked by, for example, a disk 47 having apertures therein through which the lines 17-19 can extend, and the disk 47 can also be configured so as to attach to a strain relief member of a cable of the lines 17-19, these features not being illustrated.

According to the invention, additional gel 41 is disposed in a storage bore 54 in communication with the cavity 43 via the connection bore 55, all formed in one of the closure portions 1, 2, in the embodiment illustrated. A face 51 of the gel in the bore 54 is maintained in compression by virtue of contact with a resiliently urged piston 49 urged by resilient means, such as a spring 50, a force of the spring being adjustable by turning a bolt 52 threadably disposed in the storage bore 54. Though the spring 50 is in compression, alternative constructions are possible whereby the gel is compressed by a spring under tension, as illustrated in FIG. 9 for the secondary closure 59. An advantage of the cavities 43, 44 having a tapering profile from a section thereof immediately adjacent the connection bore 55 is that this minimizes a magnitude of any pressure gradient longitudinally along the cavities so that the fibers at the end 45 are positively compressed.

According to the construction of FIG. 10, if a volume of either or both of the cavities 43, 44 were to change due to, for example, material creep, and/or alternatively if a volume of the gels 41, 42 were to change such as for example as would be caused by temperature variations or a change in gel chemical properties induced by absorption of environmental elements, such volumetric changes, whether they be negative or positive, can be accommodated by the resilient force of the spring 50 which maintains pressure on the gel 41, or alternatively relieves pressure therefrom, the spring being preloaded to apply a force greater than any anticipated pressure outside the closure. More particularly, in the case of expansion of the gel, the piston 49 would be deflected to the right in the drawing such that the spring 50 would absorb energy and allow the gel interface 34 to be exposed to a relatively constant pressure profile, and alternatively should the gels 41, 42 contract, the spring 50 would exert energy on the piston 49 and on the gel 41 with the result that the piston 49 would move to the left and again maintain a substantially constant pressure on the gel interface 34 and between the contacting surfaces of the gel and the communication lines 17-19. Though theoretically the force exerted by the spring 50 varies non-uniformly as a function of its displacement according to Hook's law, the range of movement and hence of pressures or forces exerted by the spring 50 can be maintained quite narrow by appropriately sizing the piston 49, the bore 54, the communication aperture 55, and the cavities 43, 44 so as to substantially maintain a relatively constant pressure profile on the communication lines 17-19, taking into consideration also the maximum range of the expected pressure outside the closure.

Due to the resilient force applied by resilient deforming system 48 which includes the piston 49, spring 50, and adjustment bolt 52, a pressure profile above a predetermined minimum pressure profile is able to be maintained on the communication lines 17–19 in the passageways 30, 31 regardless of dynamic changes which may occur over time as could occur from temperature cycling between cold nights and warm days so as to prevent any voids from being formed within the passageways 30, 31 and so as to prevent or substantially limit any kind of moisture pumping effect from an area outside the closure into the closure interior 3.

According to a preferred embodiment, the communication lines 17–19 comprise optical fibers of any type known in the art such as those including a glass core surrounded by a glass cladding surrounded by a polymeric coating, and those comprising a glass core surrounded by polymeric cladding. In addition, according to one preferred embodiment, the electronics 5 includes optical taps 14, 15, 16 which are capable of withdrawing light from cores of the optical fibers 17, 18, 19 through a side thereof and through an outer polymeric coating of the fiber, this coating either being disposed directly on the glass core or on the glass cladding, or are capable of injecting light into the fiber cores through a side thereof and through the coating, either or both withdrawal and injection utilizing a fiber bend inducing a maximum fiber strain somewhere between 0.5% and 2.0%, preferably in excess of one of 0.60%, 0.75%, 1.0%, 1.2%, 1.4%, 1.6%, and 2.0%.

According to the embodiment shown, the optical fibers 17–19 are bent, with light being withdrawn or injected at the bent portions of the optical fibers, preferably by disposing an optical coupler in contact with an outer surface of the optical fibers, the signal being withdrawn from the fiber to mean for detecting the signal and processing the signal 5, or alternatively being injected into the fiber from means 5 for generating light pulses, e.g. a laser or LED. A known disadvantage of using fiber bends for facilitating withdrawing or injecting light out of or into an optical fiber is that static fatigue can cause the fiber to break due to the stresses generated by the bends, especially when stresses generated by the bends are to be maintained in place over a substantial length of time, such as for example 1, 5, 10, 15, 20, 30 or even 40 years, and static failure is aggravated by the presence of moisture or water in the vicinity of the bends. Of course the invention is equally applicable for closures for only branching, in which case end light launch and detect techniques would be appropriate.

According to the embodiments described, the closure of the invention is particularly suited for protecting such optical fiber bends since the passageways 30, 31 are efficiently sealed by the closure passage seals 26. In addition, if maximum environmental protection is desired, the first and second closure portions 1, 2 can be made of metal, and metal gaskets 9, 10 can be disposed around perimeters of the first and second closure portions 1, 2 so as to create an essentially zero moisture vapor transmission rate through these materials. Since all polymers have a finite moisture vapor transmission rate, the gels 41, 42 of the invention being no exception, it is advantageous according to the invention to form the passageways 30, 31 sufficiently long and of minimal cross-sectional area so as to adequately decrease the total amount of moisture which can enter the closure interior 3 over time, preferable lengths being between 2–30 cm; 2–20 cm; 3–15 cm; e.g. 6–10 cm, for example, a typical cross-sectional area being 1 or 2 cm$^2$, e.g. less than 5 or 20 cm$^2$.

In addition, it is also advantageous to dispose a desiccant 33, such as a silica gel or high grade activated clay as offered by United Desiccants, within the closure interior 3 in an area which is in moisture communication with the fiber bends so as to allow a means to essentially indefinitely control the environment quality within the closure interior to any desired humidity level. Furthermore, if minimal humidity over the life of the closure is desired, after assembly, a vacuum can be applied to the closure interior by connecting a hose to part 61 on a face of the closure portion 2 so as to dry the closure interior and thereafter backflushing with a dry gas, such as nitrogen, for example.

According to the embodiment illustrated in FIG. 2, lines 20, 21 connected to the processing electronics 5 exit the closure via parts or connectors 23, 24 and enter a secondary closure 59 comprising first and second telescopically mating members 63, 64, the first member 63 containing a third gel 65 with the second member 64 containing a fourth gel 66, the third and fourth gels preferably having material properties similar to those specified for the first and second gels 41, 42. Resilient springs 69, 70 maintain the first and second members 63, 64 in telescopic engagement such that the gel surfaces 65, 66 are compressed against one another, with the outgoing communication lines 20, 21 being disposed at an interface between these gel surfaces, the lines 20, 21 exiting through apertures in sidewalls of either or both of the telescopically mating members 63, 64, the size of the apertures being such that neither one of the gels 65, 66 is substantially urged out of the secondary enclosure 59.

Accordingly, it can be appreciated that since the springs 68, 69 are continuously maintained under tension a "live" load is applied to the gel 65, 66 similar to that applied to the gels 41, 42 so that regardless of whether material creep or material contractions or expansions may occur over time, a substantially uniform pressure is always maintained within the secondary closure 59 so as to prevent any kind of water pumping force being generated due to, for example, temperature cycling. Accordingly the secondary closure 59 is also environmentally isolated and substantially prevents any substantial amounts of the environmental contaminants from entering the secondary closure 59 or the primary closure formed by the closure portions 1, 2 due to the insulated ports 23, 24.

According to a particularly preferred embodiment, the lines 20 carry CATV and other types of data information and the lines 21 are for telephone service, with some of the optical fibers being used exclusively for transmission to the closure and other similar closures in a serial bus architecture, with others of the fibers being used exclusively for transmission from the closure and other similar closures in a serial bus architecture.

An unexpected and surprising result of the invention is that the passage seals 26 not only efficiently and effectively prevent environmental contaminants such as water and moisture from entering the closure interior 3, but also that substantial pressures can be maintained on the communication lines 17–19 by compressing the gels 41, 42 so as to more effectively limit the rate of contaminant ingress and yet induce essentially negligible attenuation to the optical fibers 17–19, pressures on the gel and fibers being within the range of 0.1–53 psig, a preferred pressure being in excess of about 0.4 psig (one foot waterhead), more preferably in excess of 0.8 psig (three foot waterhead), most preferably in excess of one or more of 1.0, 2.0, 4.0, 6.0, 8.0, 10, 12, 15, 20, 30, 40, and 53 psig.

EXAMPLE 2

A Corning graded index optical fiber comprising a 100 um OD glass core, a 140 um OD glass cladding, and a 250 um OD polymeric acrylate buffer was serially looped 30 times through a gel passageway formed between first and second exposed surfaces of first and second gels, with the 30 optical fiber loops being maintained in compression between the gel surfaces by a resilient means which allowed the pressure on the optical fibers to vary between 0 psig and 53.0 psig, this pressure being measured by a pressure transducer. The gel comprised a urethane composition having a cone penetration value of about 240 ($10^{-1}$ mm) and an ultimate elongation of about 200%. Thereafter, various pressures within the range specified above were imposed on the fiber loops, and the total light loss through all the loops in dB was monitored, all measurements being taken at ambient temperature (20°–25° C.), the various pressures and dB losses being tabulated in Table 6. Since the dB losses indicated in Table 6 represents the additive loss of all 30 fiber loops, it can readily be determined that the loss imposed by the gel in pressure contact with any one fiber loops is negligible, especially less than 0.002 dB, certainly less than 0.02 and 0.01 dB.

TABLE 6

| P. PSIG | dB loss |
|---|---|
| 0.0 | 0.0 |
| 6.9 | 0.02 |
| 17.5 | 0.02 |
| 22.4 | 0.02 |
| 27.4 | 0.02 |
| 33.0 | 0.03 |
| 38.0 | 0.03 |
| 42.0 | 0.03 |
| 47.0 | 0.04 |
| 53.0 | 0.04 |

Temperature cycling was repeatedly conducted between −40° C. and +70° C. and negligible light loss was again measured. In addition, further tests were done whereby the fibers were carefully organized on a cured gel surface prior to deforming the gel so that the fibers were parallel and did not crisscross one another, and other tests were done where the fiber were intentionally repeatedly crisscrossed on the gel surface, and in all cases negligible loss was recorded.

Though the invention has been described with reference to certain preferred embodiments thereof, it should be appreciated that various modifications can be made thereto, and accordingly the invention is to be limited only by the appended claims.

What is claimed is:

1. A subscriber telephone system for interconnecting a plurality of subscriber telephones and at least one telephone central office or remote extension thereof for communicating information therebetween, comprising:

a plurality of subscriber telephones;

means for interconnecting the telephones and the telephone central office or remote extension thereof, the interconnecting means including at least one optical fiber comprising a glass core surrounded by a glass cladding surrounded by a protective coating in contact with the cladding, the coating being substantially transparent to light guided by the core used to represent the information and having an index of refraction throughout its thickness which is greater than that of the cladding, the fiber having a predetermined proof stress strength;

a plurality of optical taps serially disposed on the optical fiber and in communication with the plurality of telephones, each tap including bending means for maintaining a bend in the fiber of a radius sufficiently small so as to enable either light injection into or light withdrawal from the core of the optical fiber by passing the light being injected or detected through a side of the fiber cladding and coating at an unbroken intermittent section of the fiber, each fiber bend having a maximum radius of curvature sufficiently small so as to impose a maximum static stress on the fiber glass in excess of one-half the fiber proof stress, the bending means maintaining the maximum stress on the fiber whenever light is being transmitted on the fiber regardless of whether one or more telephones associated with the tap is in operation or is operational;

a plurality of means for enclosing various ones of the plurality of taps and bends associated therewith so as to provide a water-tight seal for the various ones of the taps capable of keeping water located outside the enclosing means from entering an interior thereof and contacting the fiber taps and associated bends;

the enclosing means including at least one water-tight fiber seal which continuously maintains pressure against a side of a continuous non-terminated portion of the fiber in excess of 0.8 psig and induces an attenuation to a light signal in the fiber portion which is equal to or less than 0.02 dB and prevents water under a pressure of about 0.8 psig from leaking through the seal, the seal including a first material having a cone penetration value from approximately 100 to 350 ($10^{-1}$ mm) and an ultimate elongation of at least approximately 30%, the first material being formed so as to have an exposed outer surface for contacting the optical fiber prior to actually contacting the optical fiber, a longitudinal length of the optical fiber thereafter being disposed along a length of the material surface, the seal further including means for deforming the first material surface in contact with the optical fiber so as to elastically deform the first material surface against the optical fiber and form a water-tight seal thereat.

2. A water-tight enclosure for environmentally protecting an optical fiber, comprising:

a water-tight housing, the housing including at least one water-tight optical fiber seal which continuously maintains pressure against a side of a continuous non-terminated portion of an optical fiber in excess of 0.8 psig and induces an attenuation to a light signal in the fiber portion which is equal to or less than 0.02 dB and prevents water under a pressure of about 0.8 psig from leaking through the seal, the seal including:

a first material having a cone penetration value from approximately 100 to 350 ($10^{-1}$ mm) and an ultimate elongation of at least approximately 30%, the first material being formed so as to have an exposed outer surface for contacting the optical fiber portion prior to actually contacting the optical fiber portion, a longitudinal length of the optical fiber thereafter being disposed along a length of the material surface;

first means for containing the first material; and means for continuously deforming the first material surface in contact with the optical fiber so as to elastically deform the first material surface against the optical fiber so as to maintain the pressure.

3. The enclosure of claim 2, the first material surface remaining continuous and unbroken at portions thereof deformed against the optical fiber, the first material consisting essentially of a gel or an impregnated foam, either open or closed cell.

4. The enclosure of claim 3, the deforming means maintaining a pressure between the first material surface and the optical fiber in excess of 8 psig so as to prevent water under a pressure of about 8 psig from leaking through the seal.

5. The enclosure of claim 2, the deforming means exerting a resilient force against the first material, the deforming means absorbing energy in response to factors which would otherwise increase a pressure between the first material surface and the optical fiber portion, the deforming means releasing energy in response to factors which would otherwise decrease the pressure between the first material surface and the optical fiber portion, the energy being absorbed from and being released into, the first material, the deforming means maintaining a substantially constant pressure on another surface of the material.

6. The enclosure of claim 2, the seal further comprising:

a second material having a cone penetration value from approximately 100 to 350 ($10^{-1}$ mm) and an ultimate elongation in excess of 30%, the second material being formed so as to have an exposed outer second surface for contacting the optical fiber portion prior to actually contacting the optical fiber portion, the longitudinal length of the optical fiber thereafter being disposed along a length of the second material surface;

second means for containing the second material; and means for securing the first and second containing means together such that the longitudinal length of the optical fiber lays between the first and second materials, the deforming means maintaining the first and second materials elastically deformed against the optical fiber portion.

7. The enclosure of claim 6, an adhesive strength of the first and second material surfaces to each other being less than a cohesive strength of each of the first and second materials and less than an adhesive strength between the first material and the first containing means and less than an adhesive strength between the second material and the second containing means so as to facilitate reentry.

8. The enclosure of claim 2, the housing further including first and second mating closure portions and a gasket therebetween, the first and second closure portions and the gasket being made of metal.

* * * * *